United States Patent [19]

Fujibayashi

[11] 4,240,705
[45] Dec. 23, 1980

[54] FIVE ELEMENT PHOTOGRAPHIC OBJECTIVE

[75] Inventor: Kazuo Fujibayashi, Yokohama, Japan

[73] Assignee: Canon Kabushiki Kaisha, Tokyo, Japan

[21] Appl. No.: 943,615

[22] Filed: Sep. 19, 1978

[30] Foreign Application Priority Data

Sep. 22, 1977 [JP] Japan ............... 52/114165

[51] Int. Cl.³ .......................... G02B 9/34
[52] U.S. Cl. ............................ 350/220
[58] Field of Search ............... 350/220, 176

[56] References Cited

U.S. PATENT DOCUMENTS 1,888,156  11/1932  Brelicke ................. 350/220
3,011,401  12/1961  Sandback ............... 350/220 X

*Primary Examiner*—Paul A. Sacher
*Attorney, Agent, or Firm*—Toren, McGeady and Stanger

[57] ABSTRACT

An objective of the expanded Tessar type is disclosed. Five elements form four components of which the first counting from the front is positive and convex toward the front, the second is a bi-concave lens, the third is a positive doublet consisting of a negative lens element and a bi-convex lens element cemented together at their adjoining surfaces, and the fourth is a bi-convex lens. The objective fulfills the following conditions:

$$0.55 < \left| \frac{R_8}{R_9} \right| < 1.4, \text{ where } R_9 < 0 \quad (1)$$
$$D_4 < 0.056f \quad (2)$$
$$0.08 < N_1 - N_2 \quad (3)$$
$$0.16f < D_5 + D_6 < 0.21f \quad (4)$$
$$\frac{0.08}{f} \leq \frac{N_4 - N_3}{R_6} < \frac{0.3}{f} \quad (5)$$
$$0.48f < |R_3| < 0.62f, \text{ where } R_3 < 0 \quad (6)$$

wherein f is the focal length of the entire lens system; Ri is the radius of curvature of the i-th surface counting from the front; Di is the axial thickness of the i-th glass or air lens element; and Ni is the refractive index of the material of the i-th lens element.

4 Claims, 12 Drawing Figures

Spherical aberration

Astigmatism

Distortion

Spherical aberration

Astigmatism

Distortion

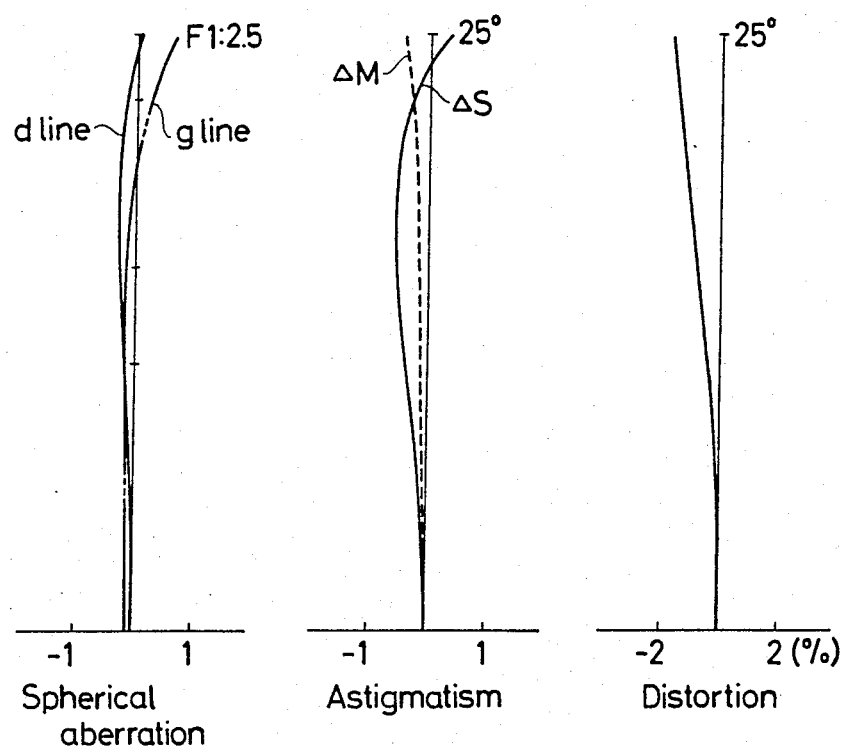

FIVE ELEMENT PHOTOGRAPHIC OBJECTIVE

BACKGROUND OF THE INVENTION

This invention relates to photographic objectives and more particularly to objectives of standard or quasi-standard field angle.

Triplet objectives of the Tessar type, though widely having used in photographic devices tend to exhibit large longitudinal deviation from an ideal image field in the sagittal plane. At the same time, their astigmatism is quite large.

Various proposals for improving the aberrations of the Tessar type objectives have been made. One of these proposals, disclosed in U.S. Pat. No. 3,011,401 makes use of an additional lens element of bi-convex form positioned at the rear of the objective. With this Tessar type of objective system it is quite difficult to achieve a good compromise between the requirements of increasing the back focal length and of minimizing the various aberrations. Another proposed system is disclosed in Japanese Patent Application Laid-Open No.Sho 51-143326 where the additional lens element is in the form of a positive meniscus lens.

SUMMARY OF THE INVENTION

An object of the present invention is to provide an objective lens system of the expanded Tessar type having a standard or quasi-standard field angle.

Another object of the invention is to provide the objective lens system of the type described with a long back focal length suited for use with a single lens reflex camera, while simultaneously minimizing increases in dimensions of the entire system particularly in the axial direction.

A further object of the invention is to provide an improved objective lens system of the type described in which the positive supplemental lens at the rear of the Tessar type objective is utilized for facilitating flatness of the image field throughout an included angle of more than 50° and in which the image field curvature is corrected to a minimum and the astigmatism reduced by a front group of the Tessar type with a suitable arrangement and choice of glass materials.

BRIEF DESCRIPTION OF THE DRAWINGS

FIGS. 6A to 6C are similar representations concerning the lens of FIG. 3.

DESCRIPTION OF THE PREFERRED EMBODIMENTS

Figure 1:
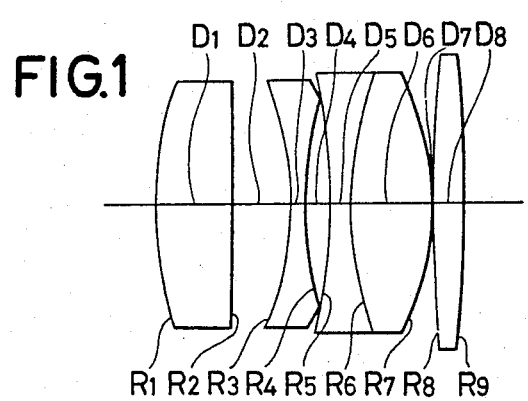
FIG. 1 is an axial sectional view of a first embodiment of an objective lens system according to the present invention.
Figure 2:
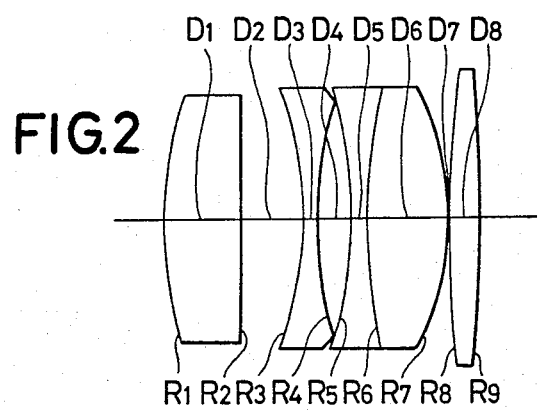
FIG. 2 is a similar view showing a second embodiment of the invention.
Figure 3:
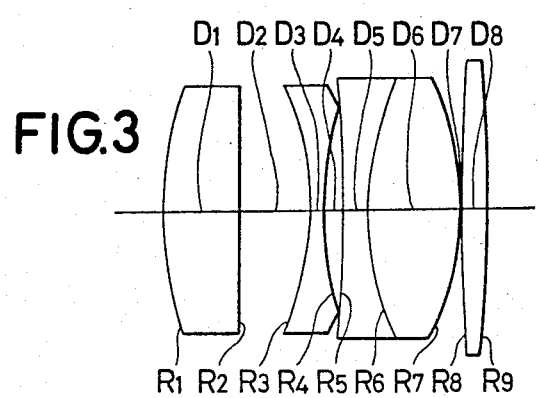
FIG. 3 is a similar view showing a third embodiment of the invention.
Figure 4A:
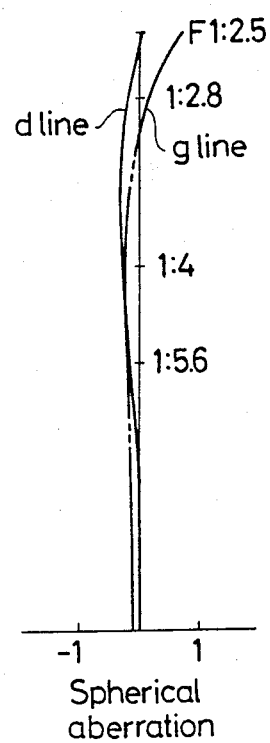
FIGS. 4A to 4C are graphic representations of spherical aberrations for the d line and g line of the sodium spectrum, astigmatism with the sagittal and meridional fans, and distortion of the lens of FIG. 1, respectively.
Figure 4B:
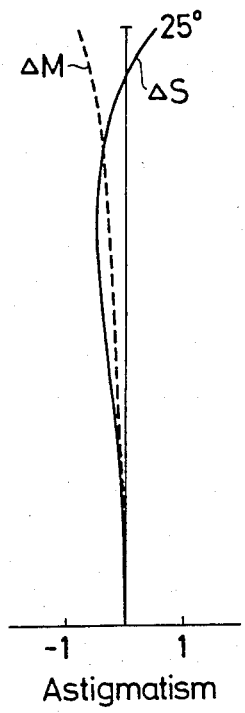
Figure 4C:
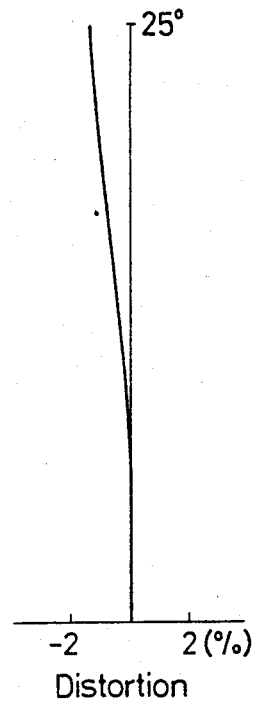
Figure 5A:
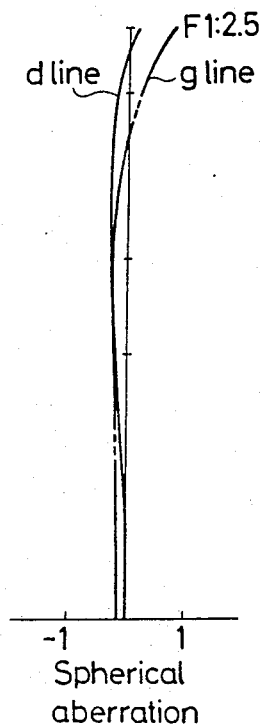
FIGS. 5A to 5C are similar representations concerning the lens of FIG. 2.
Figure 5B:
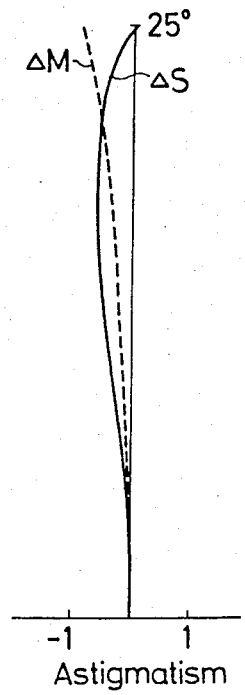
Figure 5C:
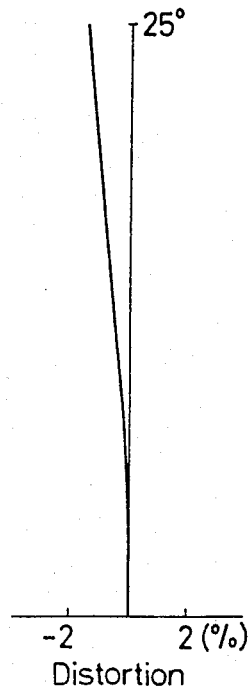

Referring to FIGS. 1 to 3, the objective lens system of the present invention comprises a triplet objective of the Tessar type followed by a positive lens element in bi-convex form. The triplet comprises, from front to rear, a positive first lens with the front surface convex toward the front, a second lens of bi-concave configuration and a positive third lens which is a doublet consisting of a negative lens element and a bi-convex lens element cemented together at their adjoining surfaces.

The system of the invention fulfills the following requirements:

$$0.55 < \left| \frac{R_8}{R_9} \right| < 1.4, \text{ where } R_9 < 0 \quad (1)$$
$$D_4 < 0.056f \quad (2)$$
$$0.08 < N_1 - N_2 \quad (3)$$
$$0.16f < D_5 + D_6 < 0.21f \quad (4)$$
$$\frac{0.08}{f} \leq \frac{N_4 - N_3}{R_6} < \frac{0.3}{f} \quad (5)$$
$$0.48f < |R_3| < 0.62f, \text{ where } R_3 < 0 \quad (6)$$

wherein f is the focal length of the entire system; $R_8$ and $R_9$ are the radii of curvature of the front and rear surfaces of the fifth or supplementary lens element respectively; $D_4$ is the axial air separation between the bi-concave lens and the doublet; $N_1$ and $N_2$ are the indices of refraction of glasses from which the first and second elements are made up; $D_5$ and $D_6$ are the axial thicknesses of the elements in the doublet respectively; $N_3$ and $N_4$ are the indices of refraction of the elements in the doublet; $R_6$ is the radius of curvature of the cemented surface; and $R_3$ is the radius of curvature of the front surface of the bi-concave lens element.

The requirement (1) represents the configuration of the surfaces of the rearmost positive lens element set forth to assist in bringing the image plane to a flatness in good balance. When the upper and lower limits of the range are violated, the image plane is over- and under-corrected at the marginal and intermediate zones respectively.

Statement (2) defines the axial air separation between the second and third components. This plays an important part in controlling halo produced in the sagittal light beam by the second component or bi-concave lens. When this limit is exceeded, the sagittal halo becomes extremely large.

The requirement (3) represents the difference between the refractive indices of the positive first and negative second lenses, which, when below 0.08, leads to substantial enlargement of the longitudinal deviations for the position of the sagittal image points.

Statement (4) defines the axial thickness of the doublet. This most seriously affects coma and astigmatism. When the upper limit is exceeded, the outward coma becomes extremely large. When the lower limit is exceeded, the substantial astigmatism appears in the picture field.

The requirement (5) represents the refractive power of the adjoining surfaces of the lenses of the doublet, and affects field curvature, astigmatism and coma aberration.

When the upper limit is exceeded, a large amount of coma is produced. When the lower limit is exceeded, good correction for field curvature and astigmatism becomes difficult to achieve.

The requirement (6) serves for minimizing the increase in dimensions of the system as the back focal length is increased while simultaneously achieving good correction of image field. When the lower limit is exceeded, large flare is produced. When the upper limit is exceeded, it becomes difficult to correct the image field while keeping the size of the system to a minimum.

Three examples of specific objective lens systems each having a large relative aperture of 1:2.5 with a total field angle of 50°, a back focal length of 0.8 f or more, and a total longitudinal length of less than 1.44 f measured from the front to the rear vertex can be constructed in accordance with the numerical data given in the following tables for the radii of curvature, R, the axial separations, D, between the successive surfaces along with the indices of refraction, Nd, for the d line of the sodium spectrum and the Abbe numbers, $\nu d$, for the various lens elements.

EXAMPLE 1

| Focal length f = 100 F-number: 2.5 2ω = 50° | | | |
|---|---|---|---|
| R | D | Nd | νd |
| 1 | 66.915 | 12.98 | $N_1 = 1.757$ | $\nu_1 = 47.9$ |
| 2 | −895.23 | 9.98 | | |
| 3 | −53.799 | 2.63 | $N_2 = 1.62588$ | $\nu_2 = 35.7$ |
| 4 | 68.239 | 4.05 | | |
| 5 | −93.639 | 3.94 | $N_3 = 1.64769$ | $\mu_3 = 33.8$ |
| 6 | 62.153 | 13.63 | $N_4 = 1.7725$ | $\nu_4 = 49.6$ |
| 7 | −50.319 | 0.44 | | |
| 8 | 301.84 | 5.19 | $N_5 = 1.7859$ | $\nu_5 = 44.2$ |
| 9 | −301.84 | | | |

$\Sigma D = 52.84$
b.f = 87.32 (Back Focal Length)
$R_8/R_9 = -1$
$N_1 - N_2 = 0.131$
$D_5 + D_6 = 17.57$
$(N_4 - N_3)/R_6 = 0.0020$

| | 3rd-order Aberration Coefficient | | | | |
|---|---|---|---|---|---|
| | Spherical Aberration | Coma | Astigmatism | Petzval Sum | Distortion |
| 1 | 0.811937 | 0.451674 | 0.251262 | 0.642166 | 0.497006 |
| 2 | 1.316481 | −1.143061 | 0.992485 | 0.047999 | −0.903421 |
| 3 | −6.284365 | 2.295920 | −0.838788 | −0.713633 | 0.567159 |
| 4 | −1.107707 | −1.019213 | −0.937789 | −0.562622 | −1.380545 |
| 5 | 0.010476 | −0.028787 | 0.079107 | −0.418680 | 0.933144 |
| 6 | 0.881258 | 0.531371 | 0.320400 | 0.068576 | 0.234540 |
| 7 | 3.892209 | −0.580501 | 0.086579 | 0.863828 | −0.141748 |
| 8 | −0.016084 | 0.067833 | −0.286087 | 0.145405 | 0.593325 |
| 9 | 1.096741 | −0.56553 | 0.291637 | 0.145405 | −0.225368 |
| Total | 0.600948 | 0.009682 | −0.041194 | 0.218445 | 0.174094 |

EXAMPLE 2

| Focal length f = 100 F-number: 2.5 2ω = 50° | | | |
|---|---|---|---|
| R | D | Nd | νd |
| 1 | 70.336 | 13 | $N_1 = 1.804$ | $\nu_1 = 46.6$ |
| 2 | −1736.6 | 10.35 | | |
| 3 | −60. | 2.67 | $N_2 = 1.64769$ | $\nu_2 = 33.8$ |
| 4 | 79.774 | 5.51 | | |
| 5 | −79.674 | 3 | $N_3 = 1.68893$ | $\nu_3 = 31.1$ |
| 6 | 100 | 13.69 | $N_4 = 1.7725$ | $\nu_4 = 49.6$ |
| 7 | −50.551 | 0.44 | | |
| 8 | 200 | 5.03 | $N_5 = 1.8061$ | $\nu_5 = 40.9$ |
| 9 | −335.99 | | | |

$\Sigma D = 53.69$
b.f = 87.37
$R_8/R_9 = -0.595$
$N_1 - N_2 = 0.156$
$D_5 + D_6 = 16.69$
$(N_4 - N_3)/R_6 = 0.0008$

EXAMPLE 3

| Focal length f = 100 F-number: 2.5 2ω = 50° | | | |
|---|---|---|---|
| R | D | Nd | νd |
| 1 | 70.989 | 12.96 | $N_1 = 1.735$ | $\nu_1 = 49.8$ |
| 2 | −2734 | 12.04 | | |
| 3 | −50 | 2.67 | $N_2 = 1.6398$ | $\nu_2 = 34.5$ |
| 4 | 67.524 | 2.87 | | |
| 5 | −236.22 | 4.44 | $N_3 = 1.62004$ | $\nu_3 = 36.3$ |
| 6 | 53.333 | 15.56 | $N_4 = 1.7725$ | $\nu_4 = 49.6$ |
| 7 | −51.493 | 0.44 | | |
| 8 | 488.89 | 4.2 | $N_5 = 1.7859$ | $\nu_5 = 44.2$ |
| 9 | −364.83 | | | |

$\Sigma D = 55.18$
b.f = 87.79
$R_8/R_9 = -1.34$
$N_1 - N_2 = 0.095$
$D_5 + D_6 = 20$
$(N_4 - N_3)/R_6 = 0.0029$

What is claimed is:

1. An objective lens system comprising, from front to rear, a positive first lens with the front surface convex toward the front, a bi-concave second lens, a positive third lens consisting of a negative element and a bi-convex lens element cemented together at their adjoining surface, and a bi-convex fourth lens, and fulfilling the following requirements:

$$0.595 \leq |R_8| / |R_9| < 1.34, \text{ where } R_9 < 0 \quad (1)$$
$$0.0287f \leq D_4 \leq 0.0551f \quad (2)$$
$$0.095 \leq N_1 - N_2 \leq 0.156 \quad (3)$$
$$0.1669f \leq D_5 + D_6 \leq 0.20f \quad (4)$$
$$\frac{0.08}{f} \leq \frac{N_4 - N_3}{R_6} \leq \frac{0.29}{f} \quad (5)$$
$$0.5f \leq |R_3| \leq 0.53799f, \text{ where } R_3 < 0 \quad (6)$$

wherein f is the focal length of the entire lens system; Ri is the radius of curvature of the i-th surface counting from the front; Di is the i-th axial thickness or air separation; and Ni is the index of refraction of the i-th lens element.

2. An objective lens system according to claim 1, wherein the characteristics of the lens elements and their spatial relationship to each other are substantially as indicated below:

| Focal length f = 100 F-number: 2.5 2ω = 50° | | | |
|---|---|---|---|
| R | D | Nd | νd |
| 1 | 66.915 | 12.98 | $N_1 = 1.757$ | $\nu_1 = 47.9$ |
| 2 | −895.23 | 9.98 | | |
| 3 | −53.799 | 2.63 | $N_2 = 1.62588$ | $\nu_2 = 35.7$ |
| 4 | 68.239 | 4.05 | | |
| 5 | −93.639 | 3.94 | $N_3 = 1.64769$ | $\nu_3 = 33.8$ |
| 6 | 62.153 | 13.63 | $N_4 = 1.7725$ | $\nu_4 = 49.6$ |
| 7 | −50.319 | 0.44 | | |

-continued

| | Focal length f = 100 F-number: 2.5 2ω = 50° | | | |
|---|---|---|---|---|
| | R | D | Nd | νd |
| 8 | 301.84 | 5.19 | N₅ = 1.7859 | ν₅ = 44.2 |
| 9 | −301.84 | | | | wherein R represents the radii of curvature of the lens surfaces; D represents the axial thicknesses or air separations; Nd represents the indices of refractions of the various lens elements; and νd represents the Abbe numbers of the lens elements.

3. An objective lens system according to claim 1, wherein the characteristics of the lens elements and their spatial relationship to each other are substantially as indicated below:

| | Focal length f = 100 F-number: 2.5 2ω = 50° | | | |
|---|---|---|---|---|
| | R | D | Nd | νd |
| 1 | 70.336 | 13 | N₁ = 1.804 | ν₁ = 46.6 |
| 2 | −1736.6 | 10.35 | | |
| 3 | −60. | 2.67 | N₂ = 1.64769 | ν₂ = 33.8 |
| 4 | 79.774 | 5.51 | | |
| 5 | −79.674 | 3 | N₃ = 1.68893 | ν₃ = 31.1 |
| 6 | 100 | 13.69 | N₄ = 1.7725 | ν₄ = 49.6 |
| 7 | −50.551 | 0.44 | | |
| 8 | 200 | 5.03 | N₅ = 1.8061 | ν₅ = 40.9 |

-continued

| | Focal length f = 100 F-number: 2.5 2ω = 50° | | | |
|---|---|---|---|---|
| | R | D | Nd | νd |
| 9 | −335.99 | | | | wherein R represents the radii of curvature of the lens surfaces; D represents the axial thicknesses or air separations; Nd represents the indices of refractions of the various lens elements; and νd represents the Abbe number of the lens elements.

4. An objective lens system according to claim 1, wherein the characteristics of the lens elements and their spatial relationship to each other are substantially as indicated below:

| | Focal length f = 100 F-number: 2.5 2ω = 50° | | | |
|---|---|---|---|---|
| | R | D | Nd | νd |
| 1 | 70.989 | 12.96 | N₁ = 1.735 | ν₁ = 49.8 |
| 2 | −2734 | 12.04 | | |
| 3 | −50 | 2.67 | N₂ = 1.6398 | ν₂ = 34.5 |
| 4 | 67.524 | 2.87 | | |
| 5 | −236.22 | 4.44 | N₃ = 1.62004 | ν₃ = 36.3 |
| 6 | 53.333 | 15.56 | N₄ = 1.7725 | ν₄ = 49.6 |
| 7 | −51.493 | 0.44 | | |
| 8 | 488.89 | 4.2 | N₅ = 1.7859 | ν₅ = 44.2 |
| 9 | −364.83 | | | | wherein R represents the radii of curvature of the lens surfaces; D represents the axial thickness or air separations; Nd represents the indices of refractions of the various lens elements; and νd represents the Abbe numbers of the lens elements.

* * * * *